United States Patent
Kramer et al.

(10) Patent No.: US 7,418,051 B2
(45) Date of Patent: Aug. 26, 2008

(54) NONSYSTEMATIC REPEAT-ACCUMULATE CODES FOR ENCODING AND DECODING INFORMATION IN A COMMUNICATION SYSTEM

(75) Inventors: Gerhard Guenter Theodor Kramer, Bedminster, NJ (US); Stephan Ten Brink, Irvine, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 797 days.

(21) Appl. No.: 10/721,100

(22) Filed: Nov. 26, 2003

(65) Prior Publication Data

US 2005/0111564 A1    May 26, 2005

(51) Int. Cl.
*H04L 5/12* (2006.01)
*H03M 13/00* (2006.01)

(52) U.S. Cl. .................. 375/265; 714/755; 714/780
(58) Field of Classification Search ......... 375/261–262, 375/260, 265, 259, 341; 455/132, 135
See application file for complete search history.

(56) References Cited

U.S. PATENT DOCUMENTS

| | | | |
|---|---|---|---|
| 6,581,182 B1 * | 6/2003 | Lee | 714/795 |
| 6,985,536 B2 * | 1/2006 | Oelcer et al. | 375/261 |
| 7,089,477 B1 * | 8/2006 | Divsalar et al. | 714/755 |
| 7,116,710 B1 * | 10/2006 | Jin et al. | 375/240 |
| 2002/0154712 A1 * | 10/2002 | Cideciyan et al. | 375/341 |
| 2003/0076890 A1 * | 4/2003 | Hochwald et al. | 375/264 |
| 2004/0002309 A1 * | 1/2004 | Ashikhmin et al. | 455/135 |
| 2004/0081073 A1 * | 4/2004 | Walton et al. | 370/204 |
| 2005/0135262 A1 * | 6/2005 | Pfister | 370/242 |

OTHER PUBLICATIONS

Pfisher et al., Capacity-Achieving Ensembles for the Binary Erasure Channel With Bounded Complexity, Sep. 6-7, 2004, Electrical and Electronics Engineers in Israel, 2004. Proceedings. 2004 23rd IEEE Convention, pp. 110-113.*
Woerz et al., Iterative Decoding for Multilevel Codes Using Reliability Information, Dec. 6-9, 1992, Global Telecommunications Conference, vol. 3, pp. 1779-1784.*
Brink Ten S. et al., "Design of Repeat-Accumulate Codes for Iterative Detection and Decoding" IEEE Transactions on Signal Processing, Inc., New York (vol. 51, No. 11), Nov. 2003.
Hui Jin; Khandekar A., McEliece R., "Irregular Repeat-Accumulate Codes" 2nd International Symposium on Turbo Codes and Related Topics, Sep. 7, 2000.

* cited by examiner

*Primary Examiner*—Mohammad H. Ghayour
*Assistant Examiner*—Lawrence B Williams

(57) ABSTRACT

A modulation and coding scheme for a communication system is based on use of nonsystematic repeat-accumulate codes for encoding channel information for transmission, and for employing a combined detection and decoding arrangement to decode the coded channel information. The nonsystematic repeat-accumulate codes may be generated by an encoder at a transmitter and decoded by a composite detector/decoder arrangement at a receiver.

19 Claims, 10 Drawing Sheets

NONSYSTEMATIC REPEAT-ACCUMULATE CODES FOR ENCODING AND DECODING INFORMATION IN A COMMUNICATION SYSTEM

BACKGROUND OF THE INVENTION

1. Field of the Invention

The present invention relates to the use of nonsystematic repeat-accumulate codes in a communication system.

2. Description of Related Art

Wireless communication systems that use multiple antennas at the transmitter and multiple antennas at the receiver, so-called multi-input multi-output (MIMO) systems, can achieve dramatically improved capacity compared to single antenna systems, i.e., systems that have a single antenna at the transmitter and a single antenna at the receiver. In a general MIMO wireless communication system, a data stream to be transmitted is processed, using well-known techniques, to form space-time coded signals that are transmitted over a plurality of different transmit antennas.

The signals emanating from the transmit antennas arrive at receive antennas as a superposition of each of the transmitted signals. Though the transmitted signals interfere with each other, received signals are processed in the receiver to separate out and decode these super-positioned signals. The receiver typically uses a MIMO detector and channel decoder several times over in an effort to reduce the number of bit errors in the decoded signal.

The channel coding used to code signals of the data stream to form the space-time coded signals is used at the receiver for error correction. That is, the channel decoder at the receiver may be able to recover bits that arrive at the receiver in error, due to noise and/or interference. Conventionally, a strong channel code, such as a turbo code, has been used. However, research has shown that an increase in the strength of the channel code does not necessarily result in a reduction in the errors in the decoded signal at the receiver when the number of antennas at the transmitter is larger than the number of antennas at the receiver.

Co-pending and commonly assigned U.S. patent application Ser. No. 10/180,727, filed Jun. 26, 2002 and entitled "MIMO SYSTEMS HAVING A CHANNEL DECODER MATCHED TO A MIMO DETECTOR" describes the use of low density parity check codes (LDPC) codes as channel codes in a communication system where the receiver has a MIMO detector, particularly when the number of transmit antennas is larger then the number of receive antennas. LDPC codes can be adjusted to change decoding properties so that a LDPC code decoder at the receiver may be designed having a transfer characteristic curve that is matched to the transfer characteristic curve of a MIMO detector.

The transfer characteristic curve may be defined as a curve that shows extrinsic mutual information content of soft value bits (bits whose value conveys both whether the bit is a one or zero and an indication of the certainty with which this is known) at an output of a device (such as a channel decoder) determined as a function of the mutual information content of soft value bits at the input of the device. A transfer characteristic curve may be illustrated with extrinsic information transfer (EXIT) charts, bit error rate (BER) charts or signal to noise ratio (SNR) charts, as is known in the art.

Repeat-accumulate (RA) codes have recently been devised as a competitive alternative to parallel concatenated (PC or turbo) and LDPC codes. RA codes are encoded by using four types of operations, in the following order: variable rate repetition encoders, an interleaver, variable rate modulo-2 adders (single parity check encoders), and an accumulator. The general structure is described in a paper by H. Jin, et al., entitled "Irregular repeat-accumulate codes," in Proc. $2^{nd}$ Int. Symp. On Turbo Codes, Brest, France, 2000. In the context of multi-input, multi-output (MIMO) systems, both LDPC and RA codes can operate near capacity of the system. One type of irregular RA codes are known as nonsystematic repeat-accumulate (RA) codes. Nonsystematic RA codes are a developing family of iteratively decodable channel codes that can operate close to capacity for many channels.

SUMMARY OF THE INVENTION

An exemplary embodiment of the present invention is directed to a method of transmitting data in a communication system. In the method, bits of a data stream are encoded with nonsystematic repeat-accumulate codes and mapped to a signal for transmission. Another exemplary embodiment is directed to a method of decoding data in a communication system. One or more transmitted signals of a data stream encoded with nonsystematic repeat-accumulate codes is detected so as to obtain a detection output. The detection output is decoded so as to obtain a decoded stream of bits for reconstructing the data stream.

Another exemplary embodiment is directed to a combined detector/decoder arrangement for a receiver in a communication system. The arrangement may include a detector for performing a bit detection from channel information received on one or more channels to provide a detector output. A first node decoder may determine extrinsic values from the detector output for use as a priori knowledge by the detector for a next bit detection iteration. The first node decoder also outputs reliability values based on the detector output that are input to a second node decoder. The second node decoder determines modified reliability values from the received reliability values. A combined output from the detector and first node decoder is represented by a first transfer characteristic curve. An output from the second node decoder is represented by a second transfer characteristic curve adapted so as to substantially match the first transfer characteristic curve, so as to facilitate decoding the received channel information at a highest possible data rate with a reduced bit error rate.

BRIEF DESCRIPTION OF THE DRAWINGS

The present invention will become more fully understood from the detailed description given herein below and the accompanying drawings, wherein like elements are represented by like reference numerals and prime and multiple prime notation indicates similar elements in alternate embodiments, which are given by way of illustration only and thus are not limitative of the present invention and wherein.

DETAILED DESCRIPTION OF THE EXEMPLARY EMBODIMENTS

Figure 1:
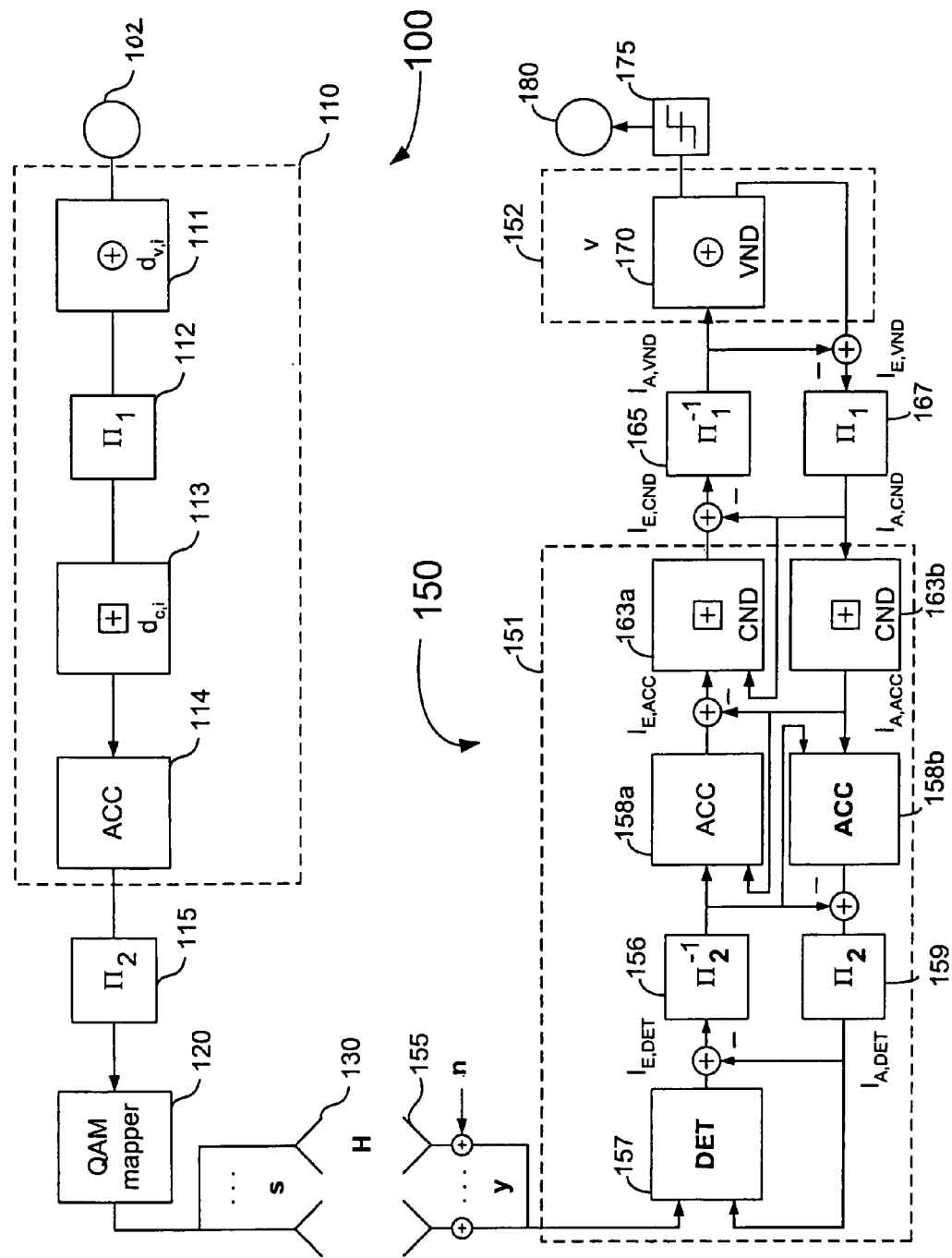
FIG. 1 illustrates an encoder arrangement for a transmitter and a combined detector/decoder arrangement for a receiver of a MIMO communication system in accordance with an exemplary embodiment of the invention.

The exemplary embodiments of the present invention are directed to a modulation and coding scheme that employs nonsystematic repeat-accumulate codes (also referred to as check-biregular, nonsystematic RA (BNRA) codes) that are generated by an encoder at a transmitter and decoded by a composite detector/decoder arrangement at a receiver. The transmitter and receiver may be part of a MIMO communication system, for example, although the exemplary embodiments to be described below could be applicable to any communication system employing multiple channel inputs and multiple channel outputs, including, but not limited to DSL communication and cable systems.

In an exemplary embodiment, the composite detector/decoder arrangement employs an inner detection loop for detection and decoding of a BNRA-encoded signal. In another exemplary embodiment, the composite detector/decoder arrangement employs a trellis detector, or 'MIMO trellis detection' for detection and decoding of the BNRA-encoded signal. In each of the exemplary embodiments, close-to-capacity performance may be achieved by substantially matching transfer characteristics curves ('curve-fitting') of a decoder and a detector in the composite arrangement. A modulation and coding scheme employing BNRA codes and MIMO trellis detection may reduce complexity and improve robustness against code parameter mismatches.

BNRA codes may be designed for both scalar channels and vector channels by using a curve—fitting procedure on extrinsic information transfer (EXIT) charts, as will be seen in further detail below. The vector channel (multi—input, multi—output or MIMO) code designs are evaluated for two demodulator structures, namely the aforementioned inner detection loop and trellis detector. As modulation and detection is of focus, the exemplary embodiments use one class of codes, namely nonsystematic repeat-accumulate codes (i.e., BNRA codes). Similar designs could also be done for other code families.

Nonsystematic Repeat Accumulate Codes

RA codes can operate near capacity for many channels, just like LDPC, parallel concatenated (PC or turbo) codes, and serially concatenated (SC) codes. Two classes of irregular RA codes include systematic and nonsystematic RA codes. Both classes are 'check-regular' in the sense that an encoder at the transmitter (or a decoder at the receiver) has a layer of check nodes where each check node takes as inputs exactly $d_c$ edges from an interleaver. The function of a check node is to perform a modulo-2 addition (XOR) of the $d_c$ bits represented by the input edges. A degree, such as a check node degree $d_c$, may therefore be considered a parameter that refers to how many bits the check node takes as its input. An iterative, check-regular, nonsystematic RA decoder requires degree $d_c > 1$ to approach capacity, yet does not even begin to converge for such cases. The term "converge" can be understood to mean that the iterative decoder can successively reduce the number of bit errors from iteration to iteration, ultimately until no bit errors remain.

This problem may be solved by making the check node layer 'bi-regular', the check nodes have either degree 1 or degree $d_c$. More generally, a nonzero fraction of the check node degrees must be 1. As this enables a successful start to iterative decoding, check-biregular, nonsystematic RA (BNRA) codes are used in accordance with the exemplary embodiments of the present invention. Hereafter, for purposes of clarity, BNRA codes will be referred to as nonsystematic repeat-accumulate (RA) codes.

MIMO Channel Model

Suppose there are M transmit and N receive antennas. Each transmitter symbol is thus an M×1 vector $s=[s_1, \ldots, s_M]^T$ whose entries take on complex values in a constellation set. We consider constellations of size $2^{M_c}$ so that each symbol carries $M \cdot M_c$ coded bits. For example, for quadrature phase—shift keying (QPSK), $M_c=2$. The average energy per transmit symbol is limited to $E_s$, and it is assumed that $E[||s_m||^2]=E_s/M$.

The receiver sees N×1 vectors y=Hs+n, where H is the N×M channel matrix and n is an N×1 noise vector. Entries of n may be independent, complex, zero-mean, Gaussian random variables with variance $\sigma^2=N_0/2$ per real component. The normalized signal-to-noise ratio ($E_b/N_0$, in dB) may thus be defined as:

$$\frac{E_b}{N_0} = \frac{E_s}{N_0} + 10\log_{10}\frac{N}{RMM_c}. \quad (1)$$

In equation (1), R is the code rate. H is assumed to be known by the receiver only, and a Rayleigh fading channel is considered so that the entries of H are independent, complex, zero-mean, Gaussian random variables with unit variance. For a piecewise constant channel the matrix H remains unchanged over long time intervals, while for an ergodic channel H changes for every symbol s. For purposes of brevity, only the ergodic model is considered, having a capacity C defined by equation (2):

$$C = E\left[\log_2 \det\left(I + \frac{E_s}{N_0}\frac{1}{M}HH^\dagger\right)\right] \quad (2)$$

In equation (2), I is the identity matrix and H† denotes the complex-conjugate transpose of H. Capacity may be achieved by using Gaussian distributed symbols s, although Gray-mapped QPSK modulation was considered for the above equation.

FIG. 1 illustrates an encoder arrangement for a transmitter and a combined detector/decoder arrangement for a receiver of a MIMO communication system in accordance with an exemplary embodiment of the invention. FIG. 1 illustrates a portion of a transmitter 100 and a portion of a receiver 150 in a communication system, such as a MIMO communication system, for example. The transmitter 100 may be representative of a transmitter at a base station, and the receiver 150 may represent a mobile station receiver, it being understood that typically both the mobile station and base station have a transmitter and a receiver.

Encoding with Nonsystematic Repeat-Accumulate Codes

In general, data to be transmitted from a transmitter in a communication system (such as a primitive data stream) may be divided into a plurality of data streams by well known techniques (not shown). In FIG. 1, a binary source may represent a source of bits for a given data stream to be transmitted. The bits are to be encoded with nonsystematic repeat-accumulate codes by encoder arrangement (shown as dotted-line box 110), and then the non-systematic repeat-accumulate coded bits are mapped to a signal at QAM mapper 120 as is known, and multiplexed onto a plurality of M transmit antennas 130 to produce the space-time coded signals for transmission over a plurality of M transmit antennas 130. Each of the space-time coded signals may be transmitted over a different one of the M transmit antennas 130.

The encoder arrangement 110 consists of four main parts: k repetition codes, an interleaver, n single parity check codes, and a differential encoder or accumulator. The repetition codes may be represented as variable nodes in a variable node encoder 111, and the interleaver as an edge interleaver 112. The single parity check codes may be represented as check nodes of a check node layer in a check node encoder 113. The accumulator may be represented as a chain of check nodes in a differential encoder 114.

The encoding of bits of a data stream with nonsystematic repeat-accumulate codes may be described with reference to FIG. 1. Bits received from binary source 102 are encoded with k repetition codes of variable rates (first encoding) at variable node encoder 111 to obtain first encoded bits. In other words, for a given number of bits, the encoding with repetition codes forms repeat bits (i.e., 100 bits in, 200 bits out, for example). The first encoded bits are subject to an interleaving process at edge interleaver 112, which permutes the first encoded bits to change bit order (re-ordering). The re-ordered first encoded bits are encoded with parity check codes (second encoding) in a bi-regular check node layer of the check node decoder 113 to obtain second encoded bits. As discussed above, the check node layer is biregular in that the check nodes have a degree 1 or $d_c$ (e.g., each check node in check node encoder 113 takes, as inputs, either 1 edge or $d_c$ edges from edge interleaver 112). More generally, a nonzero fraction of check nodes must have degree 1. The second encoded bits are then accumulated in differential encoder 114 to obtain the nonsystematic repeat-accumulate coded bits.

The nonsystematic repeat-accumulate coded bits are subject to a channel interleaving process at channel interleaver 115, prior to mapping at QAM mapper 120. In this exemplary embodiment, a channel interleaving process is necessary so as to facilitate decoding of the transmitted signal when received at a receiver in the MIMO system. Channel interleaving of the nonsystematic repeat-accumulate coded bits helps to break local dependencies to assist in operation of an accumulator decoder at the receiver side 150.

The QAM mapper 120 maps the nonsystematic bits onto a signal that may be multiplexed as a plurality of space-time codes signals onto the M transmit antennas 130. For the MIMO model described above, each transmitter symbol is thus an M×1 vector s whose entries take on complex values in a constellation set.

Combined Detector Decoder Arrangement with Inner Detection Loop

Receiver 150 includes a composite detector/decoder arrangement. A plurality of N receive antennas 155 see N×1 vectors y=Hs+n, where H is the N×M channel matrix and n is an N×1 noise vector such as additive white Gaussian noise (AWGN) vector.

The components comprising the combined detector/decoder arrangement of receiver 150 of FIG. 1 are approximately a mirror image of the components in the encoder arrangement at the transmitter. In general, in order to decode signals of a data stream received (as vector y) at antennas 155, where the data stream is comprised of bits encoded with nonsystematic repeat-accumulate codes, the received signals are detected to obtain a detection output; and the detection output is decoded to obtain a decoded stream of bits for reconstructing the data stream.

Figure 2:
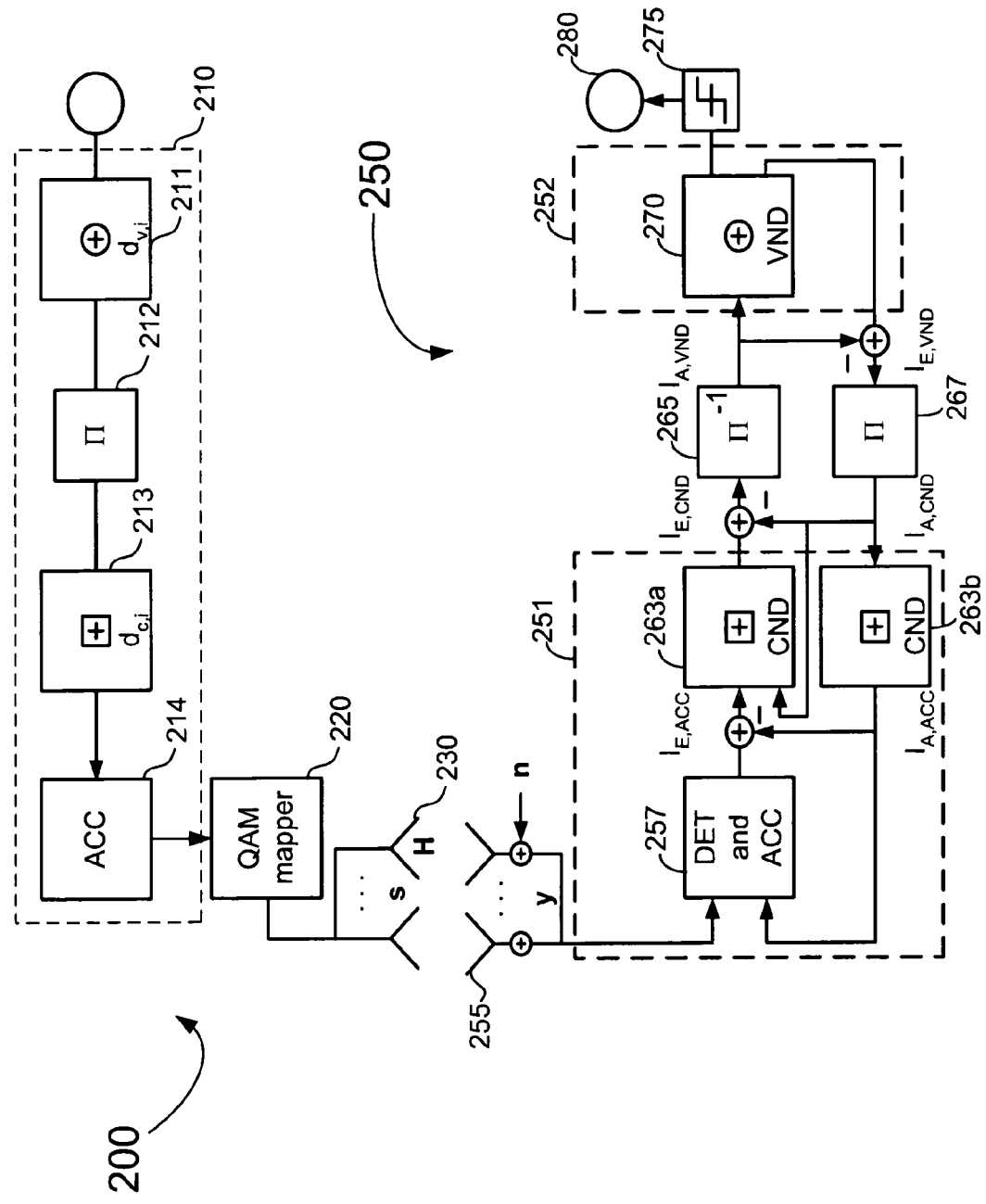
FIG. 2 illustrates an encoder arrangement for a transmitter and a combined detector/decoder arrangement for a receiver of a MIMO communication system in accordance with another exemplary embodiment of the invention.

FIG. 2 shows a combined detector decoder arrangement for receiver 150, the arrangement represented by components in dotted line boxes 151 and 152. In operation, for example, a MIMO detector 157 may process the signals received over receive antennas 155, one vector symbol at a time, and may digitally demodulate the signals, i.e. maps them from symbol space to soft value bits. For each soft bit, MIMO detector 157 computes a channel reliability value (or L-value). Suppose the channel output is y (y can be scalar (non-MIMO detector case) or vector (MIMO detector case). Then the L-value about the bit b may be expressed by equation (3):

$$L=\log[Pr(y|b=0)/Pr(y|b=1)] \quad (3)$$

The n-channel reliability values output of decoder 157 (L-value) may represent one of the nonsystematic repeat-accumulate coded bits of at least one of the signals received by the receive antennas 155 of receiver 150.

As will be shown below, each of the detector or decoders in FIG. 1 (MIMO detector 157, accumulator decoders (ACC) 158a/158b, check node decoders (CND) 163a/163b and variable node decoder (VND) 170) receives two inputs (one a feedback input), and performs an APP calculation to determine L values as a single output. VND 170 receives a zero valued feedback, thus only one input is shown).

The combined detector/decoder arrangement illustratively includes an inner detection loop, i.e., iterations between the MIMO detector 157 and the accumulator decoder (ACC) 158b. The purpose of this loop is to adequately infuse a priori knowledge needed by the MIMO detector 157 for a next detection iteration. The MIMO detector 157 performs a posteriori probability (APP) bit detection by considering all $2MM_c$ possible hypotheses on s. The detector 157's soft bit output ((these are the n-channel reliability values, also called L-values,) are forwarded to the accumulator decoder (ACC) 158a and 158b. ACC 158b computes extrinsic values from the n-channel reliability values to be used as the a priori knowledge by the detector 157 for the next detection iteration. Several detection iterations between detector 157/ACC 158b may be performed before accumulator ACC 158a decodes the detector output to generate L-values to be forwarded to CND 163a.

For example, inner accumulator decoder (ACC) 158a takes n channel reliability values (which have been de-interleaved at de-interleaver 156) and performs an a posteriori probability (APP) bit decoding (first decoding) over a memory one trellis of the ACC 158a. The ACC 158a receives two kinds of soft bit values (L-values): those from the MIMO signal (y), and those from the check node decoder (CND) 163b. Accordingly, an APP decoding process is done in ACC 158a to compute a log-likelihood ratio (L-value) for each bit.

The L-values output of ACC 158a (first set of L-values) represent partially decoded bits. The partially decoded bits are from the bits that were encoded with the repetition codes and parity check codes, which were accumulated at ACC 114 in encoder arrangement 110 to form the nonsystematic repeat-accumulate encoded bits of the received signals. In other words, one level of encoding is 'stripped away' in ACC 158a.

The resulting output L-values are forwarded to an inner check node decoder (CND) 163a (first node decoder) that includes the n check nodes (the biregular check node layer). The inner CND 163a performs a second decoding on the L-values received from the ACC 158a and on feedback (the L-values received from the interleaver 167) to generate L-values that are forwarded, after de-interleaving at de-interleaver 165, to an outer variable node decoder (VND) 170 (second node decoder) comprising k variable nodes. This 'second set' of L-values generated from the second decoding may represent a plurality of partially decoded bits. These partially decoded bits are those bits that were encoded with the repetition codes, as the nonsystematic codes and parity check codes of the signal received at receiver 150 have been decoded at ACC 158a and CND 163a.

The outer decoder (VND 170) uses these L-values to generate new L-values. This 'third set' of L-values may represent a plurality of completely decoded bits, as the repetition code encoding is decoded in VND 170, i.e., the bits should be reflective of the bits output from source 102 in the receiver 150. The third set of L-values may be forwarded to a hard decision 175 for collection, until all decoding iterations are complete. The L-values output of VND 170 may also be fed back through an edge interleaver 167 to an inner CND 163b. Finally, one decoder iteration is completed when the inner CND 163b generates L-values that it forwards back to accumulator decoder (ACC) 158b, and after the ACC 158b generates L-values that it forwards through the interleaver 159 to the DET 157. The result is a priori information useable by the MIMO detector 157 for a next detection iteration. The ACC (158a and 158b) and CND (163a and 163b) may be considered as a single decoding unit, i.e., an 'ACC & CND' decoder.

The output of the hard decision 175 are the receiver 150's decisions on the bits output by source 102 in the receiver 150. These decisions are delivered to a sink 180, and they should be the same as the bits from source 102 bits with a high probability.

Combined Detector Decoder Arrangement with MIMO Trellis Detection

FIG. 2 illustrates an encoder arrangement for a transmitter and a combined detector/decoder arrangement for a receiver of a MIMO communication system in accordance with another exemplary embodiment of the invention. FIG. 2 is somewhat similar to FIG. 1, thus only the differences are discussed.

The encoding arrangement 210 of transmitter 200 in FIG. 2 functions as in FIG. 1 and includes the same components, i.e., encoder arrangement 210 is the same as encoder arrangement 110 with the exception that no channel interleaver 115 is required prior to mapping the nonsystematic repeat-accumulate coded bits to QAM mapper 220. This means that in the transmitter 250, which is essentially a mirror image of receiver 200, the de-interleaver 156 is also omitted. Further, there is no inner detection loop in FIG. 2.

Figure 3A:
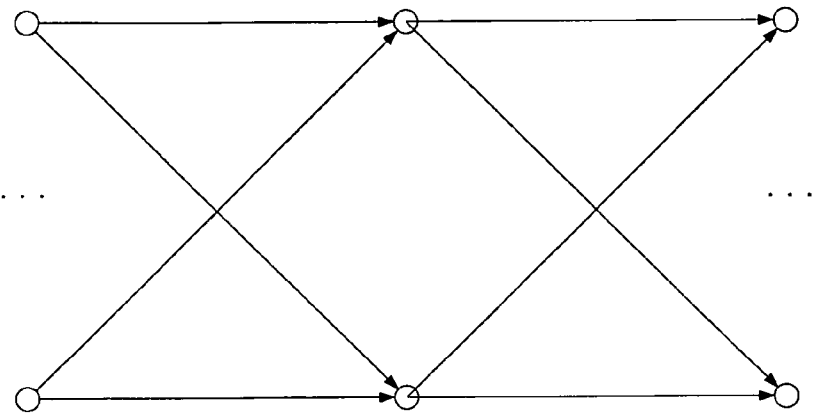
FIGS. 3A-3C illustrates trellis configurations and edge labeling in accordance with the exemplary embodiments of the present invention.
Figure 3B:
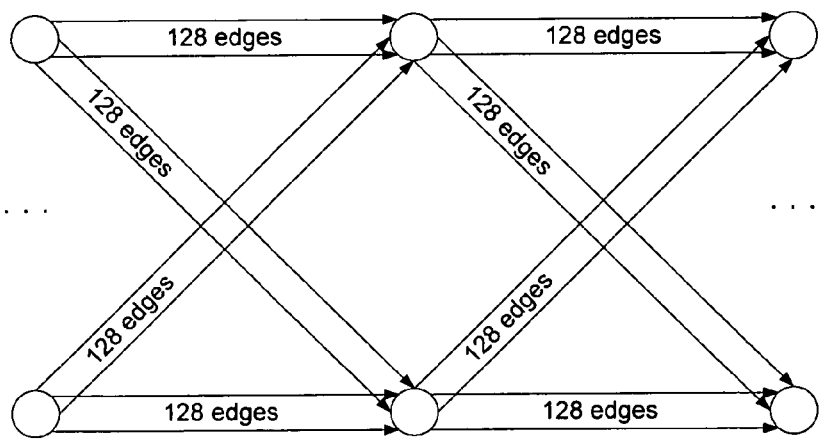
Figure 3C:
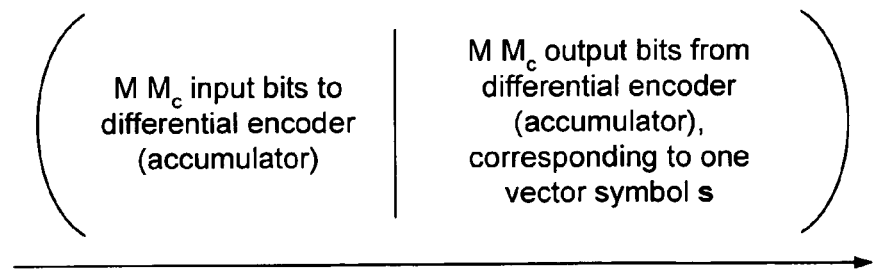

FIGS. 3A-3C illustrates trellis configurations and edge labeling in accordance with the exemplary embodiments of the present invention. FIG. 3A illustrates ACC trellis sections (binary trellis) without trellis detection. FIG. 3B illustrates ACC trellis sections with ($2^{MMc}$-ary trellis) trellis detection. The trellis diagrams in FIGS. 3A and 3B show how the ACC encoding operation is being viewed at the receiver. The state of both trellises represents the state of the ACC. An edge in the trellis represents one of the possible transitions from one ACC state to another ACC state. Each edge is labeled with the bits put out by the ACC when the corresponding ACC state transition is made. For the binary trellis, each edge is labeled by one bit, meaning that each input bit is converted into one output bit. For the $2^{MMc}$-ary trellis, each edge is labeled by $MM_c$ bits, meaning that $MM_c$ input bits are viewed by the receiver as being converted into $MM_c$ output bits. The trellis structure is primarily useful for decoding.

The MIMO detection and accumulator decoding is now performed in a single trellis (DET and ACC trellis) detector/decoder 257. This trellis has two states (0, 1) and $2^{MMc}$ incoming/outgoing edges per state, each edge being labeled by the $MM_c$ bits corresponding to one vector-channel symbol s, as shown in FIG. 3C. The transition from one state to the next can be determined by running $MM_c$ bits through the differential encoder, with $2^{MMc-1}$ transitions arriving in state 0, and $2^{MMc-1}$ transitions arriving in state 1.

For detection/decoding, the Bahl, Cocke, Jelinek, Raviv (BCJR) algorithm may be applied to the trellis in detector/decoder 257 for example, as described in the article by Bahl et al., entitled "Optimal decoding of linear codes for minimizing symbol error rate", IEEE Trans. Inform. Theory, vol. 20, PP. 284-287, March, 1974. Accordingly, FIG. 3A illustrates a memory one binary trellis that has two states. The ACC 158a/158b may be embodied as this exemplary binary trellis in the inner detection loop of FIG. 1, where decoding may be performed using a simple BCJR algorithm, for example. The detector/decoder 257 may include the $2^{MMc}$-ary trellis (4×4 QPSK symbol modulation) for the ACC portion thereof, for use with MIMO detection as shown in FIG. 2, where decoding may be performed using a tailored version of the BCJR algorithm, for example.

Trellis detection as shown in FIG. 2 may have some advantages over the inner detection loop shown in FIG. 1. First, no inner iterations are required which reduces decoding complexity; observe that the MIMO detector must perform the same APP bit detection in FIGS. 1 and 2. Second, trellis detection is more robust against code parameter mismatches, as will be explained below.

EXIT Curves and Curve Matching

Close-to-capacity performance may be achieved by matching an 'outer' extrinsic information transfer (EXIT) characteristics curve of the VND (VND 170 or 270) to an 'inner' EXIT characteristics curve of the DET&ACC&CND (e.g., DET 157/257, ACC 158a/258a, CND 163a/263a). In other words, the outer VND curve is curve-fitted to the inner DET&ACC&CND curve. This may be done offline (in advance), so that a combined detector/decoder arrangement in accordance with the exemplary embodiments of the invention may be designed to decode received signals at a highest possible data rate with a lowest possible bit error rate (BER).

The transfer characteristic curve shows extrinsic mutual information content of soft value bits at an output of a device (generically represented by '$I_E$') as a function of the mutual information content of soft value bits at the input of the device (generically represented by '$I_A$'). The $I_E$ and $I_A$ for each of the components in FIGS. 1 and 2 is shown to assist in understanding the following equations and transfer charts described hereinafter. These are modeled parameters, as the actual outputs of the components in FIGS. 1 and 2 are the aforementioned L-values. The mutual information content of soft value bits is a value for expressing the information content of bits, in this case the bits produced by a transmitter's coding process. The mutual information content is plotted on a scale of 0 to 1.

For example, a mutual information content of 0 means that no information is known about the bits and an infinite number of bits is needed to convey one bit accurately. A mutual information content of 1 means that bits are known with 100% certainty so only 1 bit is needed to convey one bit accurately, and values in between mean that 1/mutual information content is the smallest number of bits needed to convey one bit accurately For example, 0.2 means that the bits are known with enough certainty so that at least 5 bits are needed to convey one bit accurately.

EXIT Curve—VND

We begin with the VND. A variable node of degree $d_v$ has $d_v$ incoming messages, and it decodes by adding L-values. The decoder outputs are shown in equation (4):

$$L_{i,out} = L_{ch} + \sum_{j \neq i} L_{j,in}; \tag{4}$$

where $L_{j,in}$ is the jth a priori L-value going into the variable node and $L_{i,out}$ is the jth extrinsic L-value coming out of the variable node. We model $L_{j,in}$ as the output L-value of an AWGN channel whose input was the jth interleaver bit transmitted using BPSK. The EXIT function of a degree-$d_v$ variable node may then be expressed by equation (5):

$$I_{E,VND}(I_A, d_v, E_b/N_0) = J(\sqrt{d_v-1} \cdot J^{-1}(I_A))$$

In equation (5) the functions $J(\bullet)$ and $J^{-1}(\bullet)$ are given in a paper by S. ten Brink et al., entitled "Design of low-density parity-check codes for modulation and detection," submitted to IEEE Trans. Commun., June 2002, and in the thesis by S. Y. Chung entitled "On the construction of some capacity-approaching coding schemes", Ph.D. Thesis, M.I.T., Cambridge, Mass., September, 2000. The contents of each of these documents, as related to the functions $J(\bullet)$ and $J^{-1}(\bullet)$, are incorporated by reference herein.

EXIT Curve—Inner CND

Consider next the inner CND (any of CND 163a/263a/163b/263b, all operate in the same way). A check node of degree $d_c$ has $d_c+1$ incoming messages, $d_c$ from the edge interleaver 167/267, and one from the accumulator 158a (or from detector/decoder 257). The decoding of a degree $d_c$ check node is therefore the same as the decoding of a length $d_c+1$ (or rate $d_c/(d_c+1)$) single parity check code. The output L-values are thus defined by equation (6), below.

$$L_{i,out} = \ln \frac{1 - \prod_{j \neq i} \frac{1 - e^{L_{j,in}}}{1 + e^{L_{j,in}}}}{1 + \prod_{j \neq i} \frac{1 - e^{L_{j,in}}}{1 + e^{L_{j,in}}}}. \tag{6}$$

In equation (6), the indices i and j include the $d_c$ messages from the edge interleaver and the message from the accumulator. We again model $L_{j,in}$ as if one had transmitted the jth interleaver bit over an AWGN channel using BPSK.

For further analysis, we consider separately the two directions of information flow through the CND: 1) the CND-to-ACC direction where L-values are fed back from the interleaver to the ACC, and 2) the CND-to-interleaver direction where L-values are fed forward through the edge interleaver to the VND.

For the CND-to-ACC direction, a duality property for erasure channels may be used that expresses the EXIT curve $I_{E,SPC}(\bullet)$ of the length $d_c$ single parity check code in terms of the EXIT curve $I_{E,REP}(\bullet)$ of the length $d_c$ repetition (repeat) code. The result is shown in equation (7):

$$I_{E,SPC}(I_A, d_c) \approx 1 - I_{E,REP}(1 - I_A, d_c). \tag{7}$$

Simulations have shown equation (7) to be an accurate approximation, so the EXIT curve of the CND-to-ACC direction may be written as expression (8) below.

$$I_{A,ACC}(I_A, d_c) \approx 1 - I_{E,REP}(1 - I_A, d_c + 1) \tag{8}$$

$$= 1 - J\left(\sqrt{d_c} \cdot J^{-1}(1 - I_A)\right)$$

For the CND-to-interleaver direction, each CND node computes extrinsic information using its L-value from the ACC, and ($d_c-1$) L-values from the edge interleaver. We use a generalized duality result for erasure channels and approximate the EXIT curve of the CND-to-interleaver direction as shown in equation (9). In Equation (9), $I_A=I_{A,CND}$ and $I_E=I_{E,ACC}$ $$I_{E,CND}(I_A, I_E, d_c) \approx 1 - I_{E,REP}(1 - I_A, 1 - I_E, d_c) \tag{9}$$

$$= 1 - J\left(\sqrt{(d_c - 1)[J^{-1}(1 - I_A)]^2 + [J^{-1}(1 - I_E)]^2}\right)$$

EXIT Curve—Inner ACC

For the EXIT curve of the accumulator decoder (ACC), (either 158a/b or the ACC in detector/decoder 257) the EXIT function of the accumulator decoder (a unit memory trellis decoder) is computed by simulation and denoted by equation (10).

$$I_{E,ACC}(I_{A,ACC}, E_b/N_0, R)\bullet \tag{10}$$

The purpose of the ACC is to make $I_E(I_A=1)<1$. In other words, without the accumulator decoder, the check node layer will have $I_E(I_A=1)<1$. This means that the iterative decoder arrangement as shown in FIG. 1 or 2 would not converge, i.e., it would not correct all the bit errors.

EXIT Curve—Combined Inner ACC and CND

Equations (8) through (10) may be combined to approximate the EXIT curve of the combined inner ACC and CND. Equation (11) illustrates the transfer curve $I_{E,ACC\&CND}$ of the inner decoder comprising the ACC and CND.

$$I_{E,ACC\&CND}(I_{A,CND}, d_c, E_b/N_0, R) = \tag{11}$$

$$I_{E,CND}(I_{A,CND}, I_{E,ACC}, E_b/N_0, R, d_c) =$$

$$I_{E,CND}(I_{A,CND}, I_{E,ACC}(I_{A,ACC}(I_{A,CND}, d_c), E_b/N_0, R, d_c)$$

Rather than measuring $I_{E,ACC}$ and computer $I_{E,ACC\&CND}$ via equation (11), $I_{E,ACC\&CND}$ can alternatively be directly measured. This approach is practical because the latter curve does not change for the curve fitting procedure described below.

EXIT Curve for Code Mixtures

Let $D_c=2$ be the number of different check node degrees, and denote these by $\bar{d}_{c1}$ and $\bar{d}_{c2}$. The average check node degree may be computed as shown in equation (12) below.

$$\bar{d}_c = \sum_{i=1}^{D_c} a_{c,i} \cdot \tilde{d}_{c,i} = a_{c,1} + a_{c,2} \cdot \tilde{d}_{c,2} \quad (12)$$

In equation (12), $a_{c,i}$ is the fraction of check nodes with degree $\tilde{d}_{c,i}$. Let $b_{c,i}$ be the fraction of edges incident to check nodes having degree $\tilde{d}_{c,i}$. The EXIT curve of a mixture of codes is an average of the component EXIT curves. Thus, we must average using the $b_{c,i}$ (and not the $a_{c,i}$) because it is the edges that carry the extrinsic messages. The EXIT curve of the ACC and biregular CND is therefore:

$$I_{E,ACC\&CND}(I_A) = \sum_{i=1}^{2} b_{c,i} \cdot I_{E,ACC\&CND}(I_A, \tilde{d}_{c,i}, E_b/N_0, R) \quad (13)$$

Figure 4:
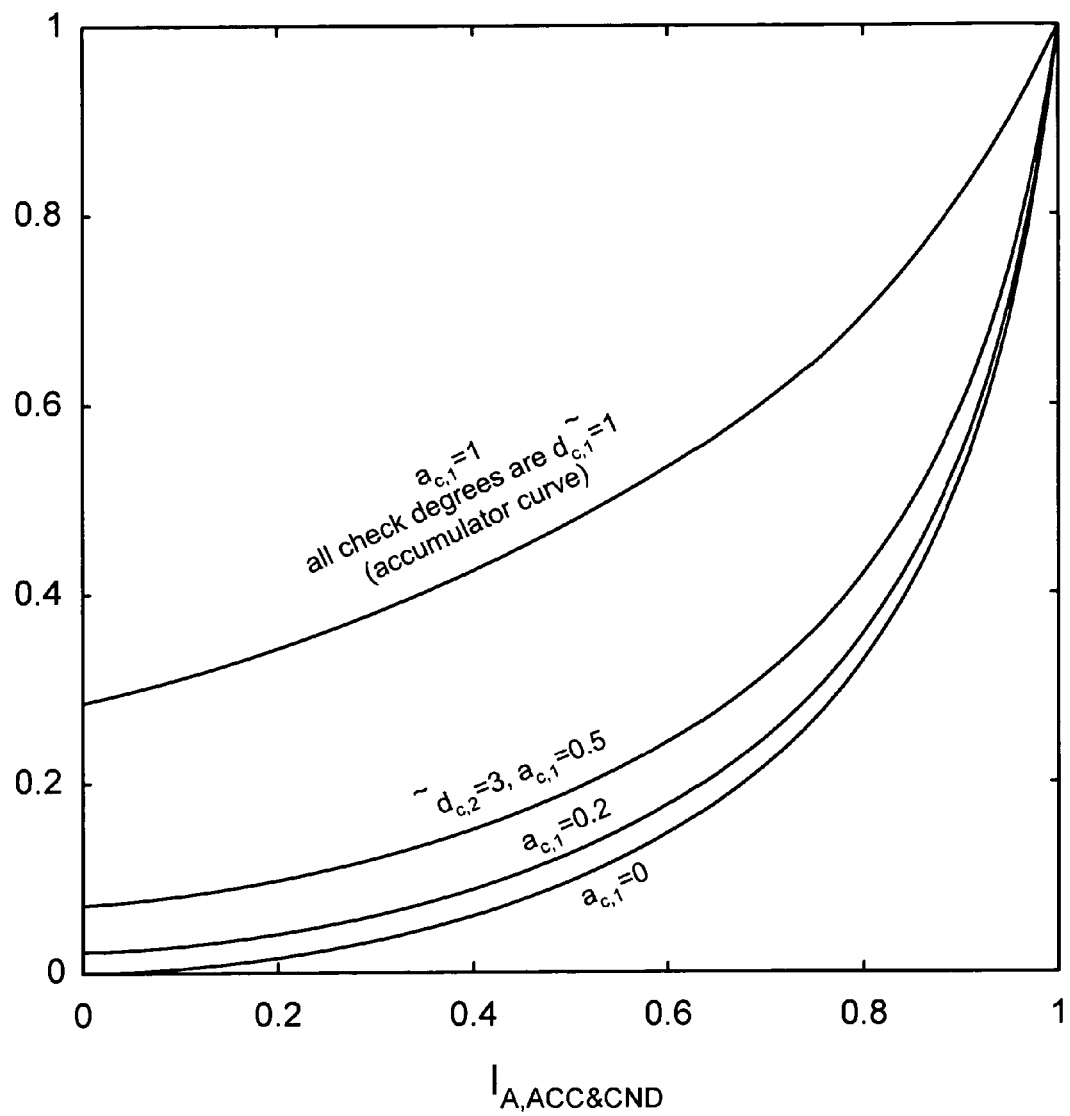
FIG. 4 is a graph illustrating EXIT curves for an ACC and a bi-regular CND in accordance with an exemplary embodiment of the invention.

FIG. 4 is a graph illustrating EXIT curves for an ACC and a biregular CND in accordance with an exemplary embodiment of the invention. Alternatively, one can estimate this EXIT curve by Monte-Carlo simulation[b]. FIG. 4 plots several such EXIT curves, where the AWGN channel has an $E_b/N_0=0.5$ dB at a code rate of R=½. Observe that $a_{c,1}>0$ makes the curves start above the origin. This will initiate convergence when the ACC and CND are combined with a VND.

Let $D_v$ be the number of different variable node degrees, and denote these by $\tilde{d}_{v,i}, i=1,\ldots,D_v$. Accordingly, the average variable node degree may be written as shown in equation (14).

$$\bar{d}_v = \sum_{i=1}^{D_v} a_{v,i} \cdot \tilde{d}_{v,i} \quad (14)$$

In equation (14), $a_{v,i}$ is the fraction of variable nodes having degree $\tilde{d}_{v,i}$. Let $b_{v,i}$ be the fraction of edges incident to variable nodes having degree $\tilde{d}_{v,i}$. The VND EXIT curve is therefore denoted by equation (15) below.

$$I_{E,VND}(I_A) = \sum_{i=1}^{D_v} b_{v,i} \cdot I_{E,VND}(I_A, \tilde{d}_{v,i}). \quad (15)$$

The number of interleaver edges is $k\bar{d}_v = n\bar{d}_c$, so that $$\bar{d}_v = \bar{d}_c/R \bullet \quad (16)$$

Note that only $D_v/2$ of the $d_{v,i}$ can be adjusted freely because equation (16) must be enforced and $\Sigma_i b_{v,i}=1$. Thus, $D_v \geq 3$ should be chosen to permit curve fitting.

EXIT Curve of the MIMO Detector

The 8-PSK MIMO detector performs APP bit detection by considering all 8 hypotheses on the transmitted symbol s. The detector EXIT curve cannot be described in closed form, so we measure it by Monte-Carlo simulation. We denote the detector by DET and its EXIT curve by equation (17) below.

$$I_{E,DET}(I_{A,DET}, E_b/N_0, R) \bullet \quad (17)$$

In equation (17), R is the code rate (the overall rate is therefore 3R bits/use)

Robustness

Figure 5:
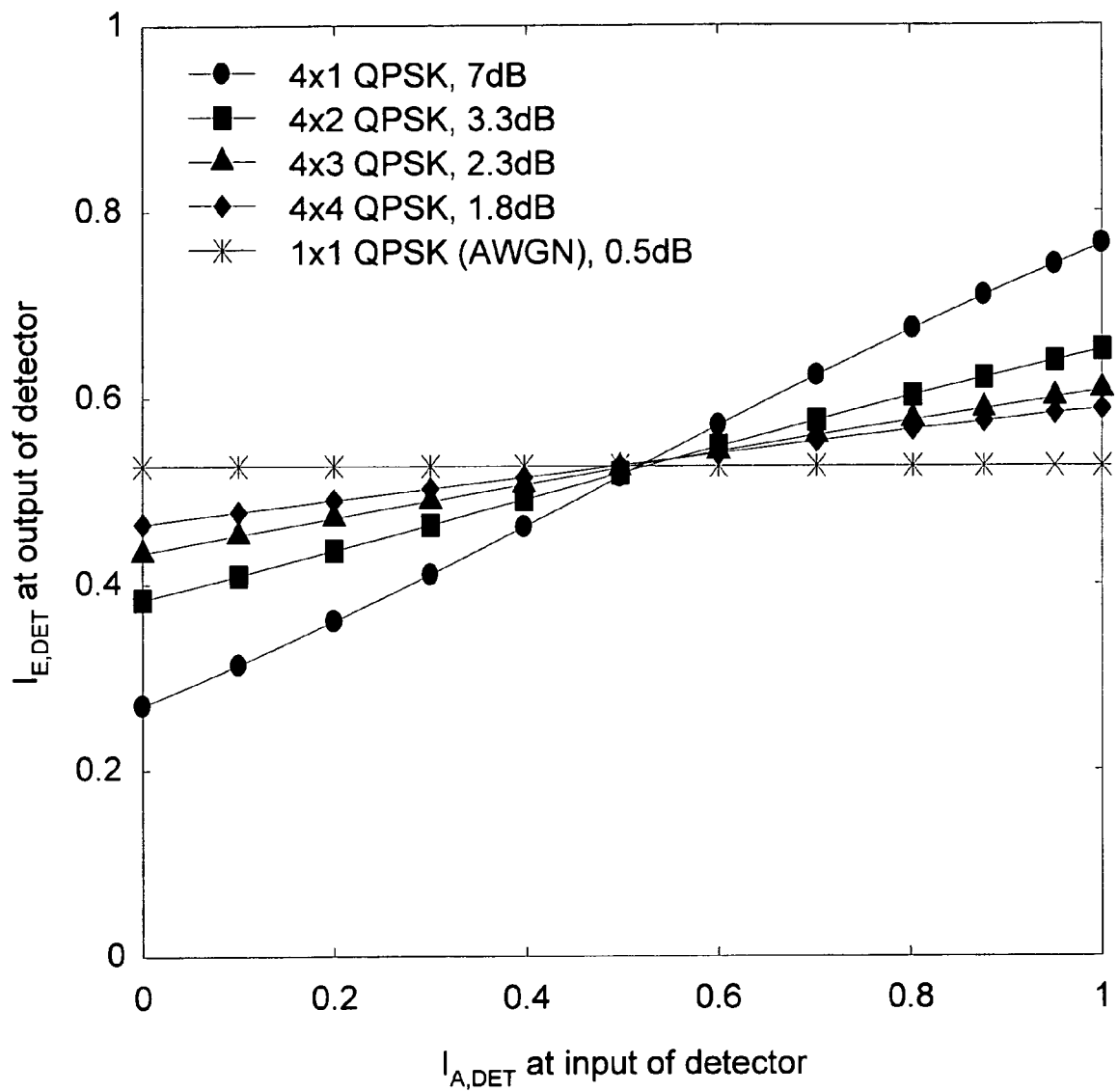
FIG. 5 is a graph illustrating MIMO detector EXIT curves in accordance with the exemplary embodiments of the invention.

FIG. 5 is a graph illustrating MIMO detector EXIT curves in accordance with the exemplary embodiments of the invention. In FIG. 5, E No is chosen so that the information rate across the channel is constant; the code rate is R=1/2. The MIMO detector EXIT curve depends mainly on the number of transmit and receive antennas. For example, a 4×4-MIMO detector does not benefit much from a priori knowledge, i.e., the EXIT curve is rather flat and close to the horizontal line of a 1×1-detector, as shown in FIG. 5. In contrast, any detector with M much larger that N (e.g., a 4×1-MIMO detector) benefits substantially from a priori knowledge, resulting in an EXIT curve with a steep slope.

Figure 6:
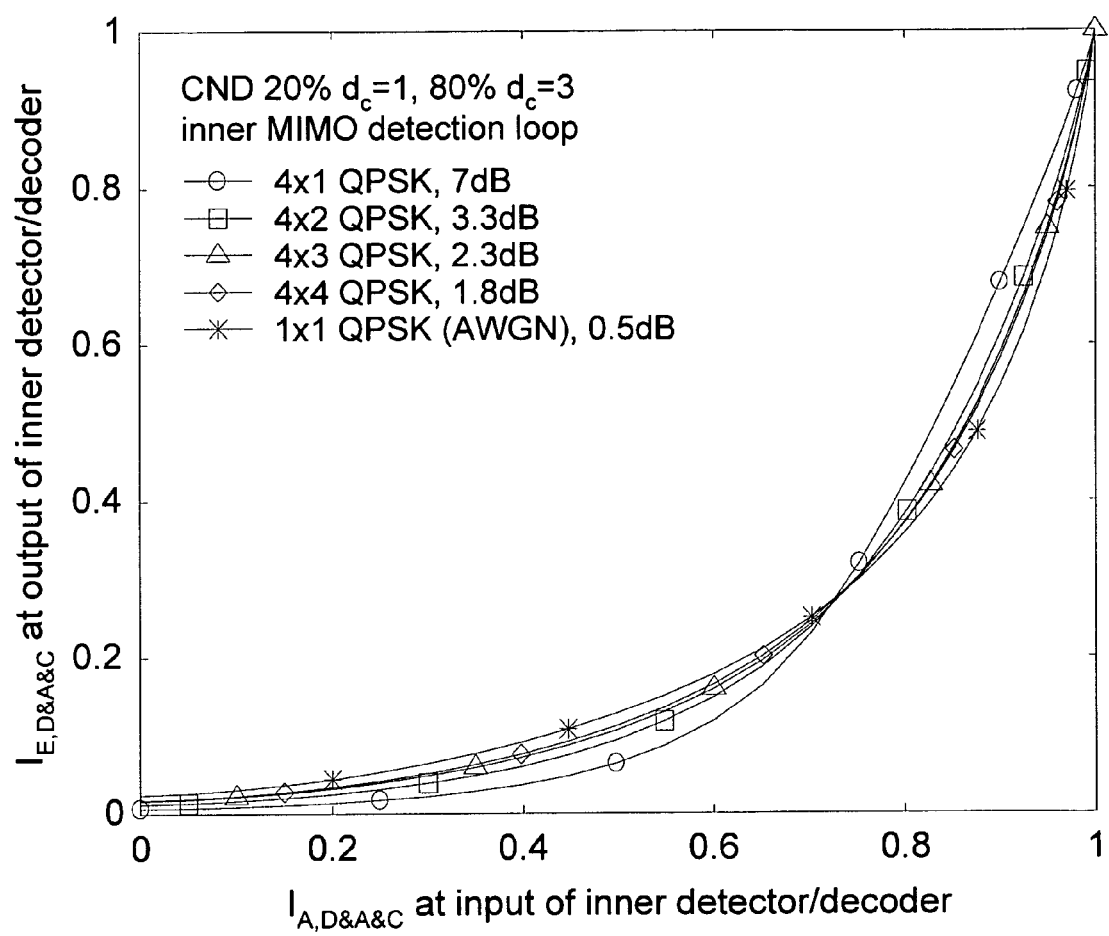
FIG. 6 illustrates EXIT curves for a combined MIMO detector, accumulator decoder and check node decoder when the inner detection loop of FIG. 1 is used.
Figure 7:
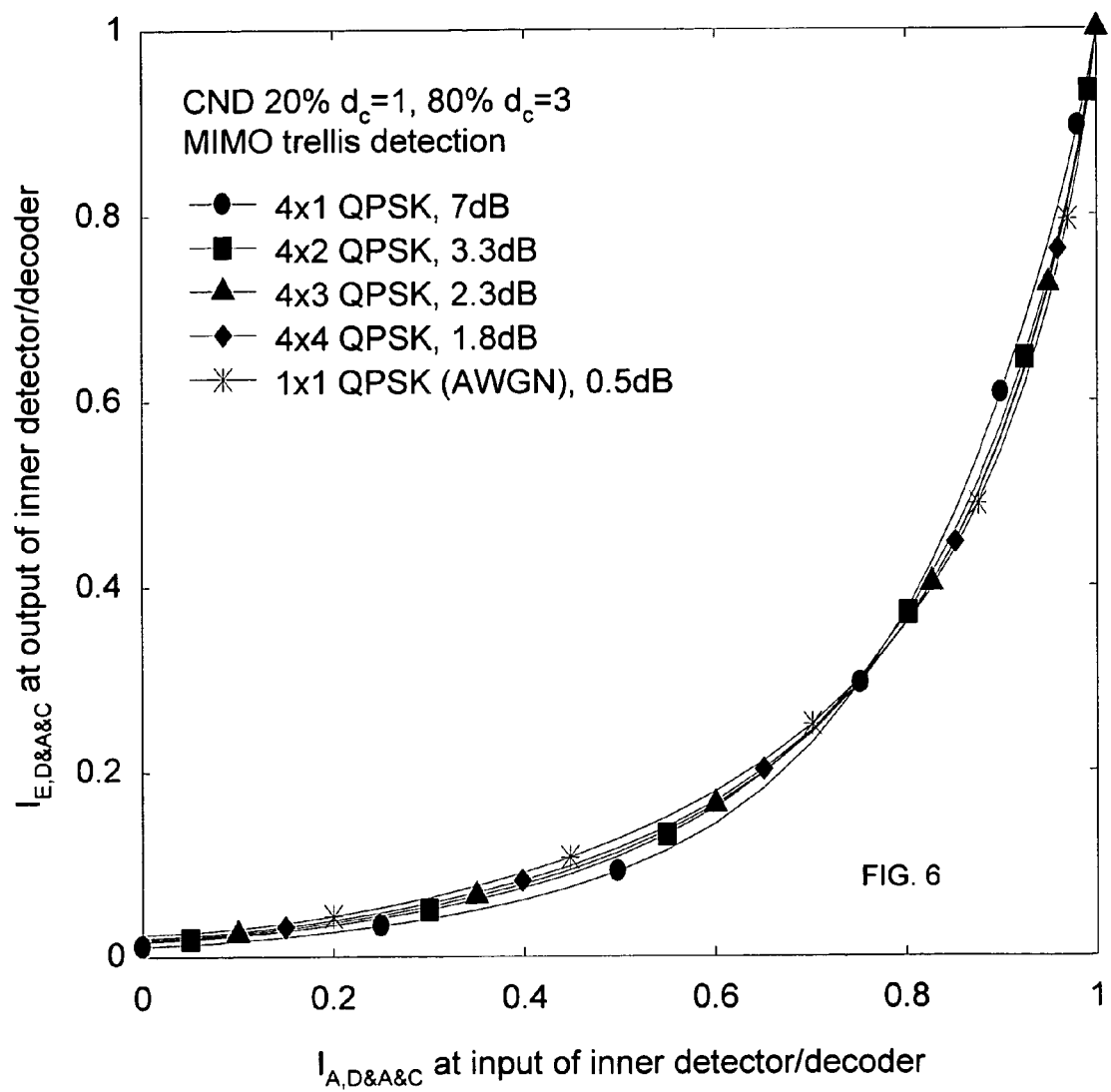
FIG. 7 illustrates EXIT curves for the combined MIMO detector, accumulator decoder and check node decoder for trellis detection as shown in FIG. 2.

FIG. 6 illustrates EXIT curves for a combined MIMO detector, accumulator decoder and check node decoder when the inner detection loop of FIG. 1 is used. FIG. 7 illustrates EXIT curves for the combined MIMO detector, accumulator decoder and check node decoder for trellis detection as shown in FIG. 2.

The detector behavior affects the EXIT curve of the combined MIMO detector (DET), accumulator decoder (ACC) and check node decoder (CND), which are abbreviates as D&A&C. FIG. 6 shows such EXIT curves for different M and N antennas when an inner detection loop is used, as described with respect to FIG. 1. Observe that the 4×4-curve differs significantly from the 4×1 curve. FIG. 7 shows the corresponding EXIT curves for trellis detection. Observe that the curves are now closer to each other than for the inner detection loop.

Figure 8:
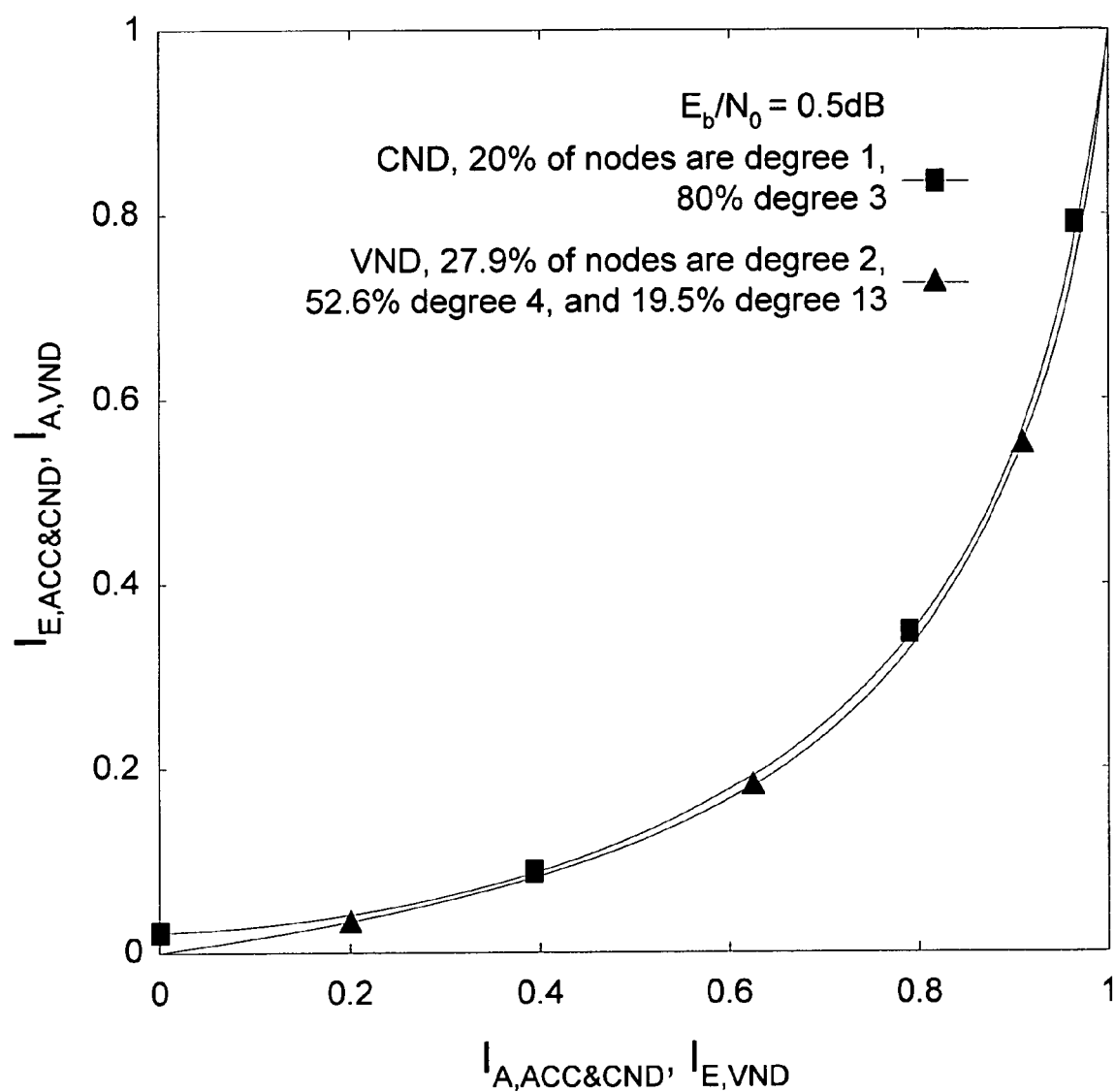
FIG. 8 illustrates an example of an EXIT curve matching for nonsystematic check-biregular RA codes.

FIG. 8 illustrates an example of an EXIT curve matching for nonsystematic check-biregular RA codes. The parameters used to generate FIG. 8 include R=1/2, $E_b/N_0=0.5$ dB, $a_{c,1}=0.2$, $\tilde{d}_{c,1}=1$, $\tilde{d}_{c,2}=3$. The VND curve (lower curve) is a mixture of curves of degree $\tilde{d}_{v,1}=2$, $\tilde{d}_{v,2}=4$, and $\tilde{d}_{v,3}=13$.

The upper curve is the transfer characteristic of the combined ACC and CND (ACC&CND) The lower curve is the transfer characteristic of the VND, which has been designed to substantially match the combined ACC&CND curve. FIG. 8 shows a case where there is no MIMO detector employed, e.g., BPSK modulation without MIMO, (1×1 decoding). In other words, the iterative decoder shown in FIGS. 1 and 2 collapses to a single trellis with no detection iterations needed. However, FIG. 8 is provided to illustrate the significance of curve matching between the combined ACC&CND curve and the VND curve.

Figure 9:
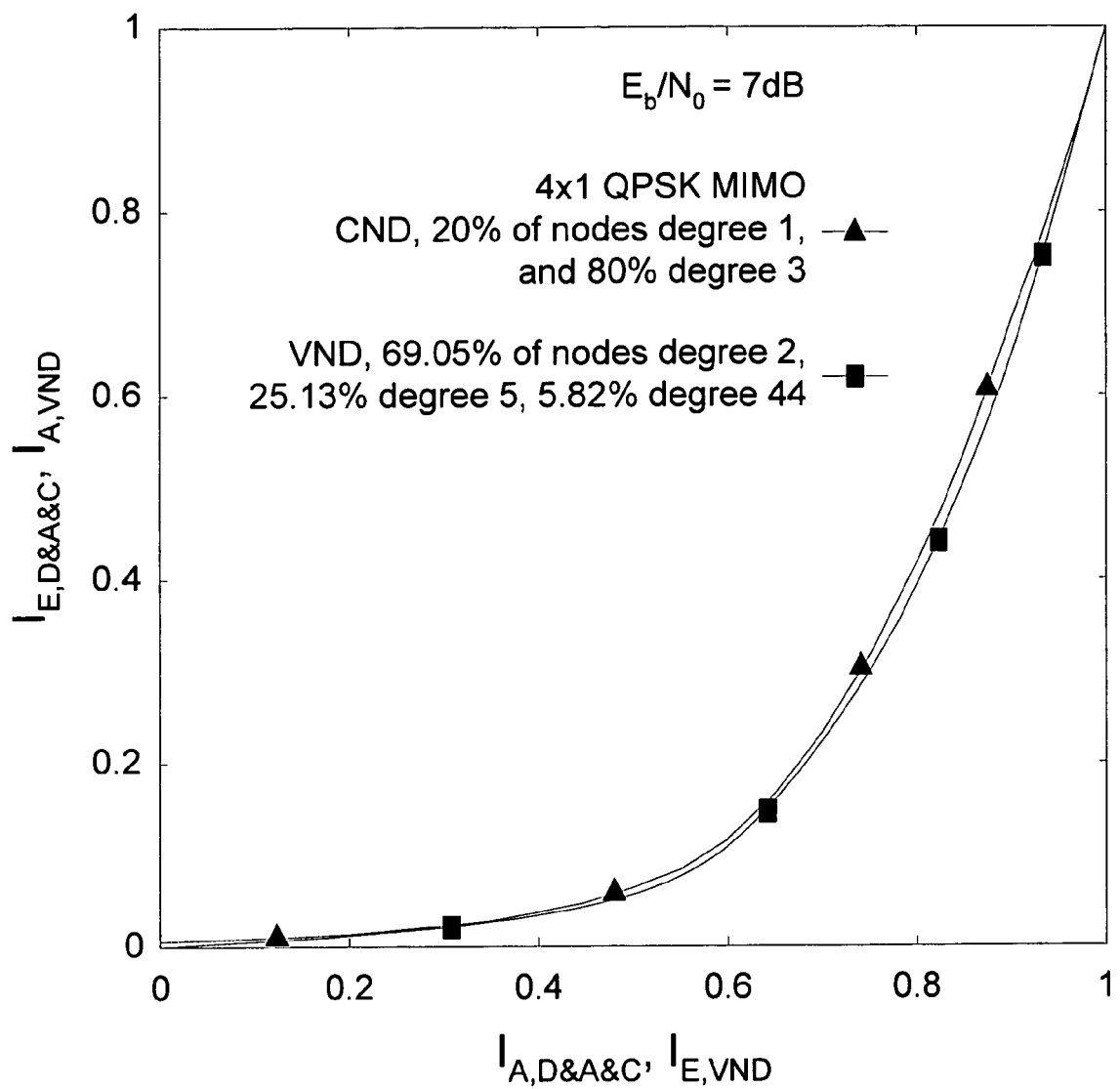
FIG. 9 illustrates another example of an EXIT curve matching for nonsystematic check-biregular RA codes.

The iterative decoding begins at the (0, 0) point in FIG. 8. The output extrinsic information of the first decoding iteration of the combined ACC&CND is given by the filled square above the (0, 0) point. This information is also the input mutual information for the VND (shown as $I_{A,VND}$ in FIGS. 1 and 2). Next, the output extrinsic information of the VND ($I_{E,VND}$ in FIGS. 1 and 2) is given by the point on the lower curve that lies directly to the right of the filled square. One continues bouncing between the two curves until the decoder converges, desirably to the (1, 1) point, in which case all errors have been corrected. As shown in FIG. 8, the curves have a narrow space between them, known as a 'convergence tunnel,' and do not cross (converge) until about the (1, 1) point FIG. 9 illustrates another example of EXIT curve matching for nonsystematic check-biregular RA codes. FIG. 9 illustrates a case in which a receiver includes a combined detector/decoder arrangement having an inner detection loop as shown in FIG. 1, where the MIMO detector is a 4×1 QPSK MIMO detector. The parameters used to generate FIG. 9 include R=1/2, $E_b/N_0=7$ dB. The lower curve is the transfer characteristic of the VND, which has been designed to substantially match a combined DET&ACC&CND curve ('inner D&A&C curve') between the curves up until about the (1, 1) point.

Summarizing the design procedure in reference to FIGS. 8 and 9, EXIT curve matching refers to (1) having an open convergence tunnel between the curves and (2) having this tunnel be narrow. The first of these conditions means that the two curves do not intersect, and that the iterative decoder can converge to the (1, 1) corner point, to provide a low bit error probability. The second condition ensures that the coded system is operating near channel capacity (i.e., maximizing system throughput).

As discussed above, code design reduces to matching the outer VND curve to the inner D&A&C-curve. This means that if several inner curves are similar, an outer curve designed for one of them will perform reasonably well for all of them. This suggests that code parameter mismatches (mismatches where an encoder and decoder synchronize a channel as something different than what it actually is) affects communication systems using trellis detection less than those using an inner detection loop.

Figure 10:
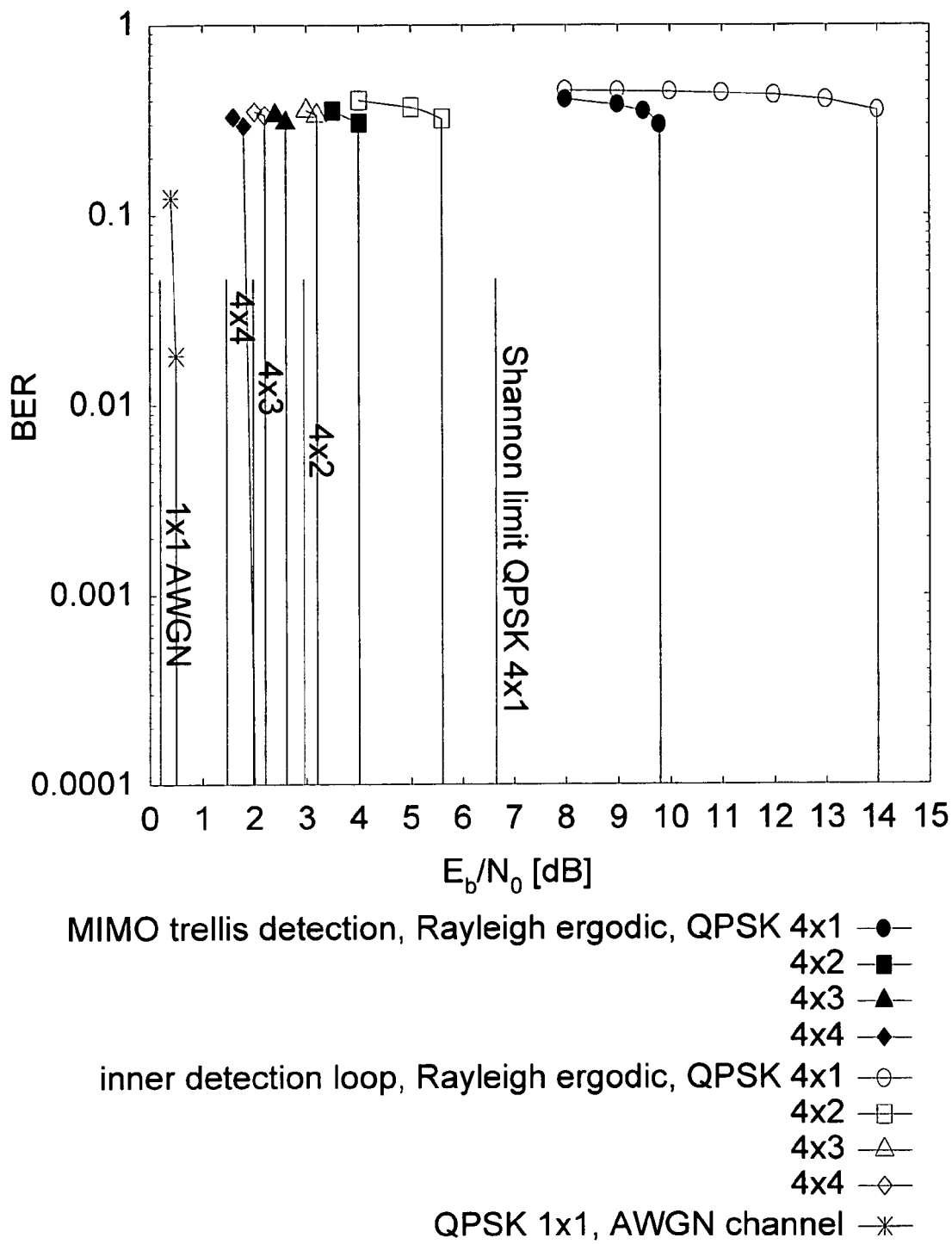
FIG. 10 is a bit error rate (BER) chart for various MIMO channels.

FIG. 10 is a bit error rate (BER) chart for various MIMO channels. The following experiment was performed to verify the prediction that systems using trellis detection are less affected to code mismatches. The inventors designed an RA code for an AWGN channel, but the RA code was used for all the MIMO channels Performance penalties were expected because the code was not matched to the detectors individually. FIG. 10 plots the simulation results.

Referring to FIG. 10, it may be observed that the performance penalty is small for 4×4-channels, but is significant for 4×1-channels. Observe further that trellis detection suffers much less from code parameter mismatches than an inner detection loop. This means trellis detection is more forgiving if a channel varies faster than the time needed to adjust the code parameters. Accordingly, trellis diction is more robust against code parameter mismatches.

The above conclusions will also hold for any code rate, any number of transmit antennas, and many other channel models, e.g., quasistatic channels. Furthermore, adding an accumulator to other codes, e.g., LDPC codes, might also convey robustness to their decoders when used with trellis detection.

The advantages of using nonsystematic RA codes, as opposed to systematic RA codes, are twofold. First, code design is simplified because changing the variable node degrees changes only one of the transfer characteristics, rather than both. Second, the decoding is made more robust to channel variations when combined with a MIMO trellis detector. This is because the channel variations affect only the combined MIMO trellis detector and check node decoder transfer characteristic, and not the variable node transfer characteristic. In contrast, for systematic RA codes the channel variations will also affect the variable node transfer characteristic, and hence the decoder loses the robustness advantages of the trellis.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

We claim:

1. A method of transmitting data in a communication system, comprising the steps of:
   encoding bits of a data stream with check-biregular, nonsystematic repeat-accumulate codes, the encoding of the bits including using a check node layer, the check node layer having a non-zero fraction of check nodes with a degree of 1; and
   mapping the encoded bits to a signal for transmission.

2. The method of claim 1, wherein the encoding step includes:
   first encoding bits of the data stream with repetition codes to obtain first encoded bits;
   re-ordering a bit order of the first encoded bits based on an interleaving process;
   second encoding the re-ordered first encoded bits with parity check codes to obtain second encoded bits;
   accumulating the second encoded bits to obtain nonsystematic repeat-accumulate coded bits; and
   subjecting the nonsystematic repeat-accumulate coded bits to an interleaving process prior to the mapping step for facilitating decoding of the transmitted signal when received at a receiver.

3. The method of claim 1, wherein the encoding step includes:
   first encoding bits of the data stream with repetition codes to obtain first encoded bits;
   re-ordering a bit order of the first encoded bits based on an interleaving process;
   second encoding the re-ordered first encoded bits with parity check codes to obtain second encoded bits; and
   accumulating the second encoded bits to obtain nonsystematic repeat-accumulate coded bits for the step of mapping.

4. A method of decoding data in a communication system, comprising the steps of:
   detecting one or more transmitted signals of a data stream encoded with check-biregular, nonsystematic repeat-accumulate codes to obtain a detection output; and
   decoding the detection output to obtain a decoded stream of bits for reconstructing the data stream, the decoding of the bits including using a check node layer, the check node layer having a non-zero fraction of check nodes with a degree of 1.

5. The method of claim 4, wherein the detection output is a plurality of channel reliability values representing nonsystematic repeat-accumulate coded bits of at least one of the transmitted signals.

6. The method of claim 5, wherein the decoding step includes:
   first decoding the plurality of reliability values to obtain a first output; and
   second decoding the first output to obtain a second output; and
   third decoding the second output to obtain a third output that is fed back for the second decoding and then the first decoding to complete a decoding iteration that provides decoding information for a next decoding iteration.

7. The method of claim 6, wherein
   the first decoding step further includes performing an a posteriori probability decoding process to obtain the first output,
   the first output is a first set of log-likelihood ratio values representing partially decoded bits from decoding nonsystematic repeat-accumulate encoded bits of at least one of the transmitted signals, so that the partially decoded bits reflect bits of the data stream that have been subject only to repetition encoding and parity-check encoding at a receiver.

8. The method of claim 7, wherein
the second decoding step further includes generating the second output from the first set of log-likelihood ratio values, and
the second output is a second set of log-likelihood ratio values representing partially decoded bits that have had non-systematic repeat accumulate codes and parity check codes decoded, so that the partially decoded bits reflect bits of the data stream that have been subject only to repetition encoding at the receiver.

9. The method of claim 8, wherein the second decoding step includes performing an a posteriori probability decoding process based on the first set of log-likelihood ratio values and an input feedback value to generate the second output.

10. The method of claim 8, wherein
the third decoding step further includes generating the third output from decoding the second set of log-likelihood ratio values, and
the third output is a third set of log-likelihood ratio values representing completely decoded bits of the data stream.

11. The method of claim 10, wherein the third decoding step includes performing an a posteriori probability decoding process based on the second set of log-likelihood ratio values.

12. The method of claim 6, wherein
the first, second and third outputs are modeled in advance, each by a corresponding transfer characteristic curve that accounts for the nonsystematic repeat-accumulate codes for at least one transmitted signal, and
the transfer characteristic curve modeling the third output is fit to the transfer characteristic curves of one or both of the first and second outputs to facilitate decoding the transmitted signals at a highest possible data rate with a lowest possible bit error rate.

13. A combined detector/decoder arrangement for a receiver in a communication system, comprising:
a detector for performing a bit detection of a data stream including check-biregular, nonsystematic repeat-accumulate codes received on one or more channels to provide a detector output;
a first node decoder for determining extrinsic values from the detector output for use as a priori knowledge by the detector for a next bit detection iteration, and for outputting reliability values, wherein the detector and first node decoder are represented by a first transfer characteristic curve, and the first node decoder includes a check node layer, the check node layer having a non-zero fraction of check nodes with a degree of 1; and
a second node decoder for determining modified reliability values from the outputted reliability values, wherein the second node decoder is represented by a second transfer characteristic curve adapted so as to substantially match the first transfer characteristic curve.

14. The arrangement of claim 13, wherein matching of the transfer characteristic curves on a transfer chart facilitates decoding the received data stream at a highest possible data rate with a reduced bit error rate by leaving an open convergence tunnel in the transfer chart.

15. The arrangement of claim 13, wherein the detector includes:
an inner detection loop having a multiple-input, multiple output (MIMO) detection portion for performing a posteriori probability bit detection on the received data stream to output soft bits to the first node decoder, and an accumulator decoder to perform an a posteriori probability decoding process to feedback a priori knowledge to the detection portion for a next bit detection iteration at the detection portion.

16. The arrangement of claim 13, wherein the detector performs MIMO trellis detection on the received data stream for providing soft bits to the first node decoder, and accumulator decoding to feedback a priori knowledge for a next MIMO trellis detection iteration.

17. The arrangement of claim 13, wherein
the detector output represents channel reliability values for a nonsystematic repeat-accumulate coded bit-stream, and
the first node decoder is a combination of an accumulator decoder and a check node decoder that includes a check node layer having a small fraction of degree one check nodes to decode the nonsystematic repeat-accumulate coded bit-stream.

18. The arrangement of claim 17, wherein the reliability values output from the check node decoder represent partially decoded bits of the received data stream channel information that have had non-systematic repeat accumulate codes and parity check codes decoded, so that the partially decoded bits reflect bits of the channel information that have been subject only to repetition encoding at a receiver.

19. The arrangement of claim 13, wherein
the second node decoder is a variable node decoder comprising k variable nodes to decode bits of the reliability values received from the first node decoder, wherein the modified reliability values output from the variable node decoder reflect completely decoded bits of the received data stream.

* * * * *